(12) United States Patent
Chen et al.

(10) Patent No.: US 10,712,514 B2
(45) Date of Patent: Jul. 14, 2020

(54) OPTICAL MODULE

(71) Applicant: InnoLight Technology (Suzhou) LTD., Suzhou, Jiangsu (CN)

(72) Inventors: Long Chen, Jiangsu (CN); Yuzhou Sun, Jiangsu (CN); Xiongfei Zhai, Jiangsu (CN); Donghan Wang, Jiangsu (CN); Zhenzhong Wang, Jiangsu (CN); Meng Fang, Jiangsu (CN); Chao Zhang, Jiangsu (CN); Xigui Fang, Jiangsu (CN); Xiangzhong Wang, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 10 days.

(21) Appl. No.: 16/227,508

(22) Filed: Dec. 20, 2018

(65) Prior Publication Data
US 2019/0204517 A1   Jul. 4, 2019

(30) Foreign Application Priority Data

Dec. 30, 2017  (CN) .......................... 2017 1 1488573

(51) Int. Cl.
*G02B 6/42* (2006.01)
*G02B 6/28* (2006.01)

(52) U.S. Cl.
CPC .......... *G02B 6/4272* (2013.01); *G02B 6/426* (2013.01); *G02B 6/428* (2013.01); *G02B 6/4281* (2013.01); *G02B 6/4284* (2013.01); *G02B 6/4204* (2013.01); *G02B 6/4246* (2013.01)

(58) Field of Classification Search
CPC .... G02B 6/4272; G02B 6/428; G02B 6/4284; G02B 6/426; G02B 6/4281; G02B 6/4246; G02B 6/4204; H04B 10/40
USPC ........................................................ 250/239
See application file for complete search history.

(56) References Cited

U.S. PATENT DOCUMENTS

| 8,721,193 | B2 * | 5/2014 | Amirkiai | ............ | G02B 6/4278 |
| | | | | | 385/92 |
| 9,557,500 | B1 * | 1/2017 | Luo | ...................... | G02B 6/2804 |
| 2015/0256259 | A1 | 9/2015 | Huang et al. | | |
| 2016/0191166 | A1 | 6/2016 | Wang et al. | | |
| 2017/0187462 | A1 | 6/2017 | Luo et al. | | |

FOREIGN PATENT DOCUMENTS

| CN | 203840348 U | 9/2014 |
| CN | 104503044 A | 4/2015 |
| CN | 104597573 A | 5/2015 |
| CN | 105572816 A | 5/2016 |

* cited by examiner

*Primary Examiner* — Seung C Sohn
(74) *Attorney, Agent, or Firm* — Finnegan, Henderson, Farabow, Garrett & Dunner, LLP

(57) ABSTRACT

An optical module includes a housing, and a main circuit board, an optical transmitting assembly, an optical receiving assembly, and an electrical connector that are disposed inside the housing. Each one of the optical transmitting assembly and optical receiving assembly includes at least two sets of optoelectronic chips, an optical assembly, and an optical fiber receptacle. The electrical connector electrically connects the optical transmitting assembly and/or optical receiving assembly to the main circuit board.

10 Claims, 2 Drawing Sheets

OPTICAL MODULE

CROSS-REFERENCE TO RELATED APPLICATION

This application is based upon and claims priority to Chinese Patent Application 201711488573.3, filed on Dec. 30, 2017, the entire content of which is incorporated herein by reference.

FIELD OF THE DISCLOSURE

The present disclosure relates to the field of optical communication and, more particularly, to an optical module.

BACKGROUND

With the rapid development of optical communication and the Internet in recent years, users' demands for the network have also sharply increased, resulting in a surge of traffic in telecommunication trunk networks, with traffic increasing at a rate of 50% to 80% each year. In order to adapt to the fast development of the network market, the transmission speed of optical modules has also been rapidly increasing, and now 100 G, 200 G, and even 400 G optical modules have appeared. The increase in the speed of optical modules poses significant problems such as heat dissipation and miniaturization. The need to have more optical components laid out inside a smaller optical module housing while dealing with the problem of heat dissipation has become a challenge in the industry.

Chinese patent No. 201420189088.1 discloses a replaceable optical transmitting module and an optical transceiver having the same. The optical transmitting module contains a plurality of individually and independently disposed optical subassemblies, and at least one positioning mount disposed on the optical transceiver. This type of optical transmitting module is not able to accommodate more components because the quantity of lasers, chips, and optical assemblies that can be accommodated is limited by the optical subassemblies and layout. Additionally, this type of optical transmitting module has poor heat dissipation and is difficult to assemble.

SUMMARY

One embodiment of the present disclosure provides an optical module. The optical module includes a housing. The optical module also includes a main circuit board, an optical transmitting assembly, an optical receiving assembly, and an electrical connector that are disposed inside the housing. One of the optical transmitting assembly and the optical receiving assembly includes at least two sets of optoelectronic chips, an optical assembly, and an optical fiber receptacle. The at least two sets of optoelectronic chips in the one of the optical transmitting assembly and the optical receiving assembly are arranged in a stacked manner on planes parallel to a plane on which the main circuit board is located. The optical assembly in the one of the optical transmitting assembly and the optical receiving assembly realizes optical path connections between the at least two sets of optoelectronic chips and the optical fiber receptacle. The other one of the optical transmitting assembly and the optical receiving assembly includes at least two sets of optoelectronic chips, an optical assembly, and an optical fiber receptacle. The at least two sets of optoelectronic chips in the other one of the optical transmitting assembly and the optical receiving assembly are arranged side-by-side on a plane parallel to the plane on which the main circuit board is located. The optical assembly in the other one of the optical transmitting assembly and the optical receiving assembly realizes optical path connections between the optical fiber receptacle and the at least two sets of optoelectronic chips. The electrical connector electrically connects the optical transmitting assembly and/or optical receiving assembly to the main circuit board.

DETAILED DESCRIPTION

Figure 1:
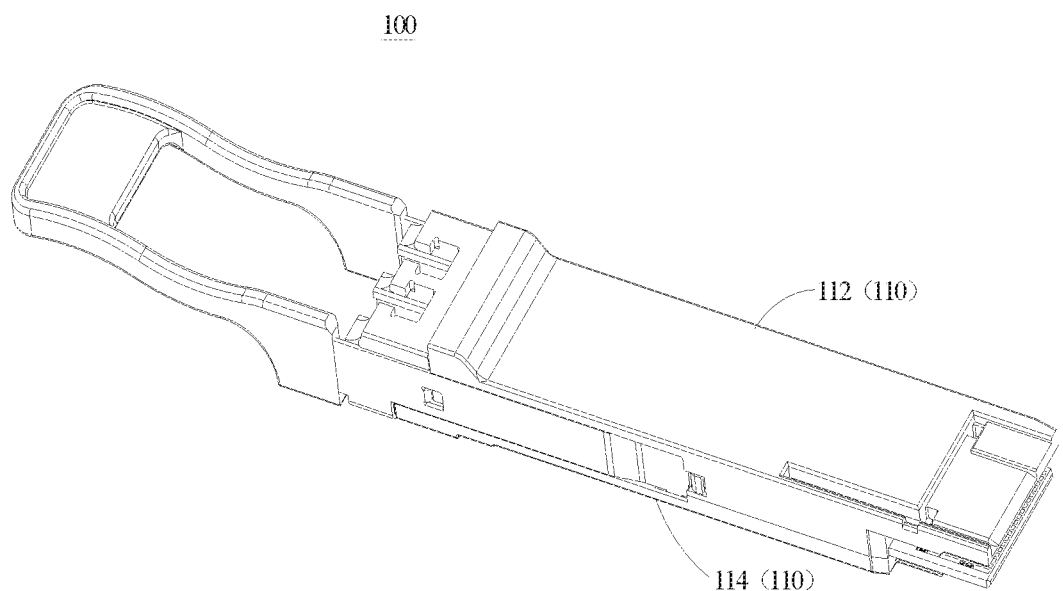
FIG. 1 is a diagram illustrating a perspective view of an optical module in one embodiment of the present disclosure.

The text below provides a detailed description of the present disclosure with reference to specific embodiments illustrated in the attached drawings. However, these embodiments do not limit the present disclosure; the scope of protection for the present disclosure covers changes made to the structure, method, or function by persons having ordinary skill in the art on the basis of these embodiments.

In order to facilitate the presentation of the drawings in the present disclosure, the sizes of certain structures or portions have been enlarged relative to other structures or portions; therefore, the drawings in the present disclosure are only for the purpose of illustrating the basic structure of the subject matter of the present disclosure.

Additionally, terms in the text indicating relative spatial position, such as "upper," "above," "lower," "below," and so forth, are used for explanatory purposes in describing the relationship between a unit or feature depicted in a drawing with another unit or feature therein. Terms indicating relative spatial position may refer to positions other than those depicted in the drawings when a device is being used or operated. For example, if a device shown in a drawing is flipped over, a unit which is described as being located "below" or "under" another unit or feature will be located "above" the other unit or feature. Therefore, the illustrative term "below" may include positions both above and below. A device may be oriented in other ways (rotated 90 degrees or facing another direction), and descriptive terms that appear in the text and are related to space should be interpreted accordingly.

Moreover, it should be understood that although the terms "first," "second," etc. may be used in the text to describe various components or structures, the objects being described should not be limited by the aforementioned terms. The aforementioned terms are only for the purpose of differentiating between the objects being described. For example, a first surface may be referred to as a second surface, and, similarly, a second surface may also be referred to as a first surface; this does not deviate from the scope of protection for the present disclosure.

A purpose of the present disclosure is to provide an optical module that has efficient heat dissipation capacity and a more rational spatial layout.

Figure 2:
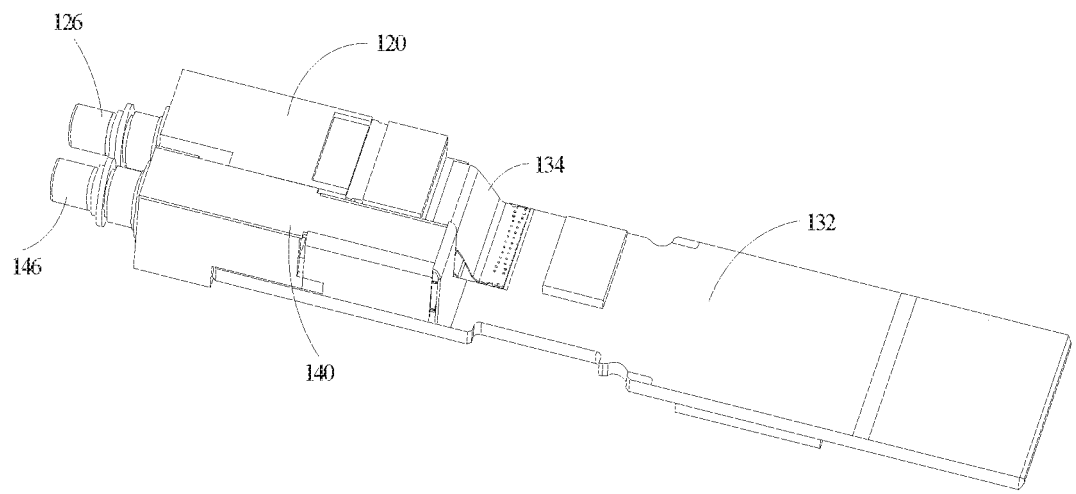
FIG. 2 is a structural diagram illustrating the interior of the optical module illustrated in FIG. 1 after its housing is removed.

FIG. 1 is a diagram illustrating a perspective view of an optical module 100 in one embodiment of the present disclosure. FIG. 2 is a structural diagram illustrating an interior of the optical module 100 illustrated in FIG. 1 after its housing is removed. As illustrated in FIG. 1 and FIG. 2, the optical module 100 includes a housing 110. The optical module 100 also includes a main circuit board 132, an optical transmitting assembly 120, an optical receiving assembly 140, and an electrical connector that are disposed inside the housing 110.

The housing 110 includes an upper housing 112 and a lower housing 114. The upper housing 112 and the lower housing 114 are assembled together to accommodate components such as the main circuit board 132, the optical transmitting assembly 120, the optical receiving assembly 140, and the electrical connector. The main circuit board 132 is a rigid circuit board on which electronic components are disposed, such electronic components including a capacitor, a resistor, a processing chip, etc. One end of the main circuit board 132 is connected to the electrical connector, and the other end is a gold finger that is used to provide an external electrical connection. The electrical connector may include a flexible board, i.e., a flexible circuit board. In the embodiment illustrated in the drawings, the electrical connector includes a plurality of flexible connecting boards 134.

The optical transmitting assembly 120 and the optical receiving assembly 140 of the optical module 100 have similar structures. The exemplary optical transmitting assembly 120 includes an optoelectronic chip, a substrate, an optical assembly, an optical fiber receptacle, and a fixing portion. Specifically, in the exemplary optical transmitting assembly 120, the optoelectronic chip includes a laser, the substrate is a transmitting-end substrate, the optical assembly is a transmitting-end optical assembly, the optical fiber receptacle is a transmitting-end optical fiber receptacle, and the fixing portion is a transmitting-end fixing board. Similarly, the exemplary optical receiving assembly 140 includes an optoelectronic chip, a substrate, an optical assembly, an optical fiber receptacle, and a fixing portion. Specifically, in the exemplary optical receiving assembly 140, the optoelectronic chip includes a photoelectric detector, the substrate is a receiving-end substrate, the optical assembly is a receiving-end optical assembly, the optical fiber receptacle is a receiving-end optical fiber receptacle, and the fixing portion is a transmitting-end fixing board.

Figure 3:
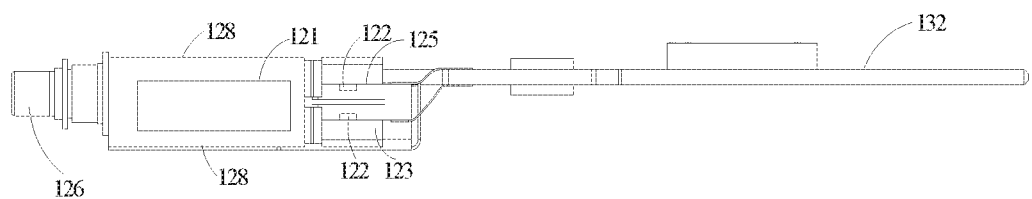
FIG. 3 is a structural diagram illustrating an optical transmitting assembly and a main circuit board of the optical module illustrated in FIG. 2.

FIG. 3 is a structural diagram illustrating the optical transmitting assembly 120 and the main circuit board 132 of the optical module 100 illustrated in FIG. 2. Referring to FIG. 3, the optical transmitting assembly 120 of the optical module 100 includes at least two sets of lasers 122, a transmitting-end substrate (including a first transmitting-end substrate 123 and a second transmitting-end substrate 125), a transmitting-end fixing board 128, a transmitting-end optical assembly 121, and a transmitting-end optical fiber receptacle 126.

In the embodiment illustrated in FIG. 3, there are two sets of lasers 122, and each set of lasers includes four lasers. In other exemplary embodiments, the number of sets of lasers and the number of lasers in each set may be adjusted as needed. One set of lasers 122 are disposed on the first transmitting-end substrate 123, and the other set of lasers 122 are disposed on the second transmitting-end substrate 125. The two sets of lasers 122 are arranged in a stacked manner on planes parallel to a plane on which the main circuit board 132 is located. The first transmitting-end substrate 123 and the second transmitting-end substrate 125 are disposed in a stacked manner. Therefore, in the present embodiment, the optical transmitting assembly 120 and the optical receiving assembly 140 are arranged side-by-side inside the housing 110, and the two sets of lasers 122 are arranged one above the other inside the housing. A person with ordinary skill in the art will now understand that between the lasers and the transmitting-end substrates there may be another medium for the purpose of achieving better fixing, heat dissipation, etc. For example, a heat dissipating pad, a TEC (thermoelectric cooler), or other components may be arranged between the lasers and the transmitting-end substrates.

The transmitting-end optical assembly 121 is configured to orient light emitted from the two sets of lasers 122 toward the transmitting-end optical fiber receptacle 126, thereby realizing optical path connections between the two sets of lasers 122 and the transmitting-end optical fiber receptacle 126. The transmitting-end optical assembly 121 mainly includes optical components such as a prism, a wavelength division multiplexer, a lens, etc. In comparison with a connection made using an optical fiber, the transmitting-end optical assembly 121 does not require an optical fiber receptacle connection, which is inconvenient to assemble, and does not require a greater number of receptacles and separate components, which could occupy a large amount of internal space in the housing 110. Additionally, in the present embodiment, the transmitting-end optical fiber receptacle 126 is an interface used to connect to an assembly external to the optical module 100.

Further, each transmitting-end substrate has two opposing surfaces. The first transmitting-end substrate 123 is described as an example below. A surface of the first transmitting-end substrate 123 is fitted and fixed on the inner surface of the upper housing 112. In the present embodiment, a good thermal connection between the first transmitting-end substrate 123 and the inner surface of the upper housing 112 may be achieved by means of thermally conductive adhesive or a thermally conductive pad. The other surface of the first transmitting-end substrate 123 is used to fix one set of lasers 122. The second transmitting-end substrate 125 and the first transmitting-end substrate 123 are the same except that one surface of the second transmitting-end substrate 125 is fitted and fixed on the lower housing 114. Thus, the two sets of lasers 122 are disposed opposing one another. The two sets of lasers 122 are relatively close to one another; accordingly, the first transmitting-end substrate 123 and the second transmitting-end substrate 125 are relatively far from one another. Heat produced by the lasers 122 is radiated more easily because the first transmitting-end substrate 123 and the second transmitting-end substrate 125 are both thermally connected to the housing 110. In other exemplary embodiments, the first transmitting-end substrate 123 and the second transmitting-end substrate 125 may also be disposed close together. Still alternatively, the first transmitting-end substrate 123 and the second transmitting-end substrate 125 may be integrated as a single transmitting-end substrate, with the two sets of lasers 122 disposed back-to-back on the two opposing surfaces of the single transmitting-end substrate, respectively. The first transmitting-end substrate 123 and the second transmitting-end substrate 125 may achieve thermal conductivity by means of connections between their side surfaces and the housing 110 or achieve heat dissipation by means of direct connections between the lasers and the housing 110.

Additionally, the optical transmitting assembly 120 further includes the transmitting-end fixing board 128 enclosing the two sets of lasers 122 and the transmitting-end optical assembly 121. The transmitting-end fixing board 128 is fixed to the transmitting-end substrate and the transmitting-end optical fiber receptacle 126. Thus, the lasers 122 and the transmitting-end optical assembly 121 are all enclosed. The optical transmitting assembly 120 thus becomes a convenient-to-assemble unit. The optical transmitting assembly 120 and the housing 110 are connected together by means of thermally conductive adhesive or a thermally conductive pad. The quantity of transmitting-end fixing boards 128, how the transmitting-end fixing boards are fixed together, and which components are enclosed thereby may be adjusted as needed.

Figure 4:
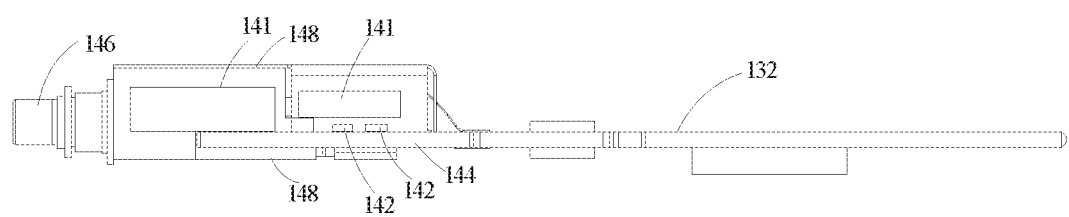
FIG. 4 is a structural diagram illustrating an optical receiving assembly and the main circuit board of the optical module illustrated in FIG. 2.

FIG. 4 is a structural diagram illustrating the optical receiving assembly 140 and the main circuit board 132 illustrated in FIG. 2. Referring to FIG. 4, the optical receiving assembly 140 of the optical module 100 includes at least two sets of photoelectric detectors 142, a receiving-end substrate 144, a receiving-end fixing board 148, a receiving-end optical assembly 141, and a receiving-end optical fiber receptacle 146.

In the embodiment illustrated in FIG. 4, there are two sets of photoelectric detectors 142, and each set of photoelectric detectors 142 includes four photoelectric detectors 142. In other exemplary embodiments, the number of sets of photoelectric detectors 142 and the number of photoelectric detectors 142 in each set may be adjusted as needed. Both of the two sets of photoelectric detectors 142 are disposed on the receiving-end substrate 144. The two sets of photoelectric detectors 142 are arranged side-by-side on a plane parallel to the plane on which the main circuit board 132 is located. As illustrated in FIG. 4, the two sets of photoelectric detectors 142 are arranged one in front of the other along a direction of a connection line from the main circuit board 132 to the receiving-end optical fiber receptacle 146. The two sets of photoelectric detectors 142 may be disposed very close to one another or at a distance from one another. Other components may also be arranged between the two sets of photoelectric detectors 142. Therefore, in the present embodiment, the optical transmitting assembly 120 and the optical receiving assembly 140 are arranged side-by-side inside the housing 110, and the two sets of photoelectric detectors 142 are arranged one in front of the other inside the housing. The receiving-end optical assembly 141 is configured to orient light from the receiving-end optical fiber receptacle 146 toward the two sets of photoelectric detectors 142, thereby realizing optical path connections between the receiving-end optical fiber receptacle 146 and the two sets of photoelectric detectors 142. The receiving-end optical assembly 141 mainly includes optical components such as a prism, a wavelength division multiplexer, a lens, etc. In comparison with a connection made using an optical fiber, the receiving-end optical assembly 141 does not require an optical fiber receptacle connection, which is inconvenient to assemble, and does not require a greater number of receptacles and separate components, which could occupy a large amount of internal space in the housing 110. Additionally, in the present embodiment, the receiving-end optical fiber receptacle 146 is an interface used to connect to an assembly external to the optical module 100.

In the present exemplary embodiment, the receiving-end substrate 144 is an extension of the main circuit board 132. Thus, the main circuit board 132 is L-shaped. A transmitting-end flexible connecting board 134 is disposed alongside the receiving-end substrate 144 extending from the main circuit board 132. In order to achieve good heat dissipation, the receiving-end substrate 144 is thermally connected to the housing 110. A highly thermally conductive medium is disposed on the receiving-end substrate 144 at a location directly opposing the two sets of photoelectric detectors 142 (i.e., the circuit board below the photoelectric detectors 142). For example, a whole copper block may be embedded in the main circuit board 132, or a heat dissipating path formed by a high density copper filling process may be used. In other exemplary embodiments, the receiving-end substrate 144 may also be a ceramic circuit board or a hybrid circuit board, etc.

Further, the optical receiving assembly 140 further includes the receiving-end fixing board 148 enclosing the two sets of photoelectric detectors 142 and the receiving-end optical assembly 141. The receiving-end fixing board 148 is fixed to the receiving-end substrate 144 and the receiving-end optical fiber receptacle 146. Thus, the photoelectric detectors 142 and the receiving-end optical assembly 141 are all enclosed. The optical receiving assembly 140 thus becomes a convenient-to-assemble unit. The optical receiving assembly 140 and the housing 110 are connected together by means of thermally conductive adhesive or a thermally conductive pad. In the present embodiment, the receiving-end substrate 144 is thermally connected to the housing 110 by means of the receiving-end fixing board 148.

In the optical module 100 of the present exemplary embodiment, the optical transmitting assembly 120 and the optical receiving assembly 140 are arranged side-by-side, the lasers 122 inside the optical transmitting assembly 120 are arranged in a stacked manner one above the other, and the photoelectric detectors 142 inside the optical receiving assembly 140 are arranged one in front of the other. Thus, more optical and electronic components may be arranged in a limited space, thereby making it easier to achieve high-speed transmission. Additionally, since heat dissipation is achieved by means of fixing the photoelectric detectors 142 and the lasers 122 to the substrates (the transmitting-end substrate and the receiving-end substrate) that are thermally connected to the housing, the heat dissipation of the optical module 100 will be effective. Moreover, the substrates and the optical fiber receptacles (the transmitting-end optical fiber receptacle 126 and the receiving-end optical fiber receptacle 146) are fixed together by means of the fixing boards (the transmitting-end fixing board 128 and the receiving-end fixing board 148), thus facilitating optical path coupling and component assembly.

A person with ordinary skill in the art will now understand that the layout of the components in the optical transmitting assembly 120 and the layout of the components in the optical receiving assembly 140 are interchangeable. In other words, the components in the optical transmitting assembly 120 may adopt the layout of the optical receiving assembly 140, and the components in the optical receiving assembly 140 may adopt the layout of the optical transmitting assembly 120. For example, the optical receiving assembly 140 can include a first receiving-end substrate and a second receiving-end substrate. One surface of the first receiving-end substrate is thermally connected to the upper housing 112, and one set of the photoelectric detectors 142 is fixed on the other surface of the first substrate; and one surface of the second receiving-end substrate is thermally connected to the lower housing 114, and the other set of photoelectric detectors 142 is fixed on the other surface of the second receiving-end substrate. Additionally, the sizes and external shapes of the optical transmitting assembly 120 and the optical receiving assembly 140 may be adjusted as needed, thus enabling the optical transmitting assembly 120 and the optical receiving assembly 140 to be conveniently fixed in the housing 110 or achieving better heat dissipation, etc. For example, the optical transmitting assembly 120 may have a larger volume, or the shape of the optical transmitting assembly 120 may be a non-cubic shape, such as two cubes of different volume or a trapezoidal body, etc. Alternatively, for convenient assembly and fixing, the optical transmitting assembly 120 and the optical receiving assembly 140 may have a click-fit connector that fixes the assemblies together.

With its rational component layout and heat dissipation design, the optical module of the present disclosure may enable the housing of the optical module to accommodate more optical and electronic components. Therefore, technical challenges to an optical module for high-speed transmission are resolved, making it possible to manufacture high-speed optical modules.

In comparison with currently available technology, the present disclosure provides the following benefits: in the technical solution provided by the present disclosure, an optical transmitting assembly and an optical receiving assembly are assembled together after at least two sets of optoelectronic chips are arranged on each of the two assemblies; thus, more components may be arranged in a limited space, thereby achieving a high-density layout and facilitating a faster optical module transmission speed.

It should be understood that despite the descriptions of embodiments in the specification, each embodiment does not entail only one independent technical solution. The specification is written this way simply for the sake of clarity. Persons having ordinary skill in the art should treat the specification as a whole. The technical solutions in the embodiments may be combined in appropriate ways to form other embodiments that may be understood by persons having ordinary skill in the art.

The series of detailed descriptions above is only intended to provide specific descriptions of feasible embodiments. The detailed descriptions are not to be construed as limiting the scope of protection for the present disclosure; all equivalent embodiments or changes that are not detached from the techniques of the present disclosure in essence should fall under the scope of protection of the present invention.

What is claimed is:

1. An optical module, comprising:
   a housing; and
   a main circuit board, an optical transmitting assembly, an optical receiving assembly, and an electrical connector that are disposed inside the housing,
   wherein
   one of the optical transmitting assembly and the optical receiving assembly comprises at least two sets of optoelectronic chips, an optical assembly, and an optical fiber receptacle, the at least two sets of optoelectronic chips in the one of the optical transmitting assembly and the optical receiving assembly being arranged in a stacked manner on planes parallel to a plane on which the main circuit board is located, and the optical assembly in the one of the optical transmitting assembly and the optical receiving assembly realizing optical path connections between the at least two sets of optoelectronic chips and the optical fiber receptacle;
   the other one of the optical transmitting assembly and the optical receiving assembly comprises at least two sets of optoelectronic chips, an optical assembly, and an optical fiber receptacle, the at least two sets of optoelectronic chips in the other one of the optical transmitting assembly and the optical receiving assembly being arranged side-by-side on a plane parallel to the plane on which the main circuit board is located, and the optical assembly in the other one of the optical transmitting assembly and the optical receiving assembly realizing optical path connections between the optical fiber receptacle and the at least two sets of optoelectronic chips; and
   the electrical connector electrically connects the optical transmitting assembly and/or optical receiving assembly to the main circuit board.

2. The optical module of claim 1, wherein at least one of the optical transmitting assembly and the optical receiving assembly further comprises at least one substrate, the at least two sets of optoelectronic chips being disposed on the substrate, and the substrate being thermally connected to the housing.

3. The optical module of claim 2, wherein, in the at least one of the optical transmitting assembly and the optical receiving assembly, the substrate and the optical fiber receptacle are fixed together.

4. The optical module of claim 2, wherein, in the at least one of the optical transmitting assembly and the optical receiving assembly, a quantity of the at least one substrate is two, and the at least two sets of optoelectronic chips are disposed correspondingly on the two substrates.

5. The optical module of claim 4, wherein the housing comprises an upper housing and a lower housing, and the two substrates in the at least one of the optical transmitting assembly and the optical receiving assembly are a first substrate and a second substrate, respectively,
   in the at least one of the optical transmitting assembly and the optical receiving assembly, one surface of the first substrate is thermally connected to the upper housing, and one set of optoelectronic chips of the at least two sets of optoelectronic chips is fixed on the other surface of the first substrate, and one surface of the second substrate is thermally connected to the lower housing, and the other set of optoelectronic chips of the at least two sets of optoelectronic chips is fixed on the other surface of the second substrate.

6. The optical module of claim 2, wherein, in the at least one of the optical transmitting assembly and the optical receiving assembly, the quantity of the substrate is one, the plane on which the substrate is located is parallel to the plane on which the main circuit board is located, and the at least two sets of optoelectronic chips are arranged one in front of the other along a direction of a connection line from the main circuit board to the optical fiber receptacle.

7. The optical module of claim 6, wherein the substrate in the at least one of the optical transmitting assembly and the optical receiving assembly is an extension of the main circuit board.

8. The optical module of claim 1, wherein the electrical connector is a flexible circuit board.

9. The optical module of claim 8, wherein at least one of the optical transmitting assembly and the optical receiving assembly is electrically connected to the main circuit board by means of two flexible circuit boards.

10. The optical module of claim 2, wherein the at least one of the optical transmitting assembly and the optical receiving assembly further comprises a fixing board enclosing the at least two sets of optoelectronic chips and the optical assembly, the fixing board being fixed to the substrate and the optical fiber receptacle.

* * * * *

UNITED STATES PATENT AND TRADEMARK OFFICE
CERTIFICATE OF CORRECTION

PATENT NO. : 10,712,514 B2
APPLICATION NO. : 16/227508
DATED : July 14, 2020
INVENTOR(S) : Long Chen et al.

Page 1 of 1

It is certified that error appears in the above-identified patent and that said Letters Patent is hereby corrected as shown below:

On the Title Page

Item (30), under "Foreign Application Priority Data," "2017 1 1488573" should read
--2017 1 1488573.3--.

Signed and Sealed this
Twenty-seventh Day of October, 2020

Andrei Iancu
*Director of the United States Patent and Trademark Office*